United States Patent
Shackelford et al.

(10) Patent No.: US 11,204,845 B2
(45) Date of Patent: Dec. 21, 2021

(54) WORKLOAD COORDINATION ON DISASTER RECOVERY SITE

(71) Applicant: International Business Machines Corporation, Armonk, NY (US)

(72) Inventors: David Michael Shackelford, Tucson, AZ (US); David C. Reed, Tucson, AZ (US); Ronald David Boenig, II, Denver, CO (US)

(73) Assignee: International Business Machines Corporation, Armonk, NY (US)

(*) Notice: Subject to any disclaimer, the term of this patent is extended or adjusted under 35 U.S.C. 154(b) by 86 days.

(21) Appl. No.: 16/679,362

(22) Filed: Nov. 11, 2019

(65) Prior Publication Data

US 2021/0141702 A1     May 13, 2021

(51) Int. Cl.
    *G06F 11/20*         (2006.01)
    *G06F 11/14*         (2006.01)
    *G06F 11/10*         (2006.01)

(52) U.S. Cl.
CPC ...... *G06F 11/2056* (2013.01); *G06F 11/1076* (2013.01); *G06F 11/1456* (2013.01); *G06F 11/1464* (2013.01); *G06F 11/1471* (2013.01)

(58) Field of Classification Search
CPC ............. G06F 11/2056; G06F 11/1456; G06F 11/1076; G06F 11/1464; G06F 11/1471
See application file for complete search history.

(56) References Cited

U.S. PATENT DOCUMENTS

| | | |
|---|---|---|
| 5,857,208 A | 1/1999 | Ofek |
| 8,271,447 B1 | 9/2012 | Natanzon et al. |
| 8,301,593 B2 | 10/2012 | Hoffmann et al. |
| 9,098,455 B2 | 8/2015 | Atluri et al. |
| 10,037,154 B2 | 7/2018 | Provenzano et al. |
| 10,275,474 B2 | 4/2019 | Provenzano |

(Continued)

FOREIGN PATENT DOCUMENTS

EP      1536338 A1      6/2005

OTHER PUBLICATIONS

Unknown, "The Trellis™ Real-Time Infrastructure Optimization Platform", Technical Bulletin, Disaster Recovery, © 2018, 28 pages.

(Continued)

*Primary Examiner* — Masud K Khan
(74) *Attorney, Agent, or Firm* — Stosch S. Sabo

(57) ABSTRACT

Described are techniques for utilization of a disaster recovery site including a method comprising receiving a mirrored data stream at a disaster recovery site from a production site. The mirrored data stream includes a workload instruction stored in a reserved record set type. The workload instruction indicates an operation to perform on a set of data that is replicated between the production site and the disaster recovery site and a time indicator indicating a correct version of the set of data. The method further comprises generating a consistency point by retrieving replicated data from the disaster recovery site corresponding to the correct version of the set of data in the production site. The method further comprises performing the operation on the consistency point, generating an output, and transmitting the output to the production site.

20 Claims, 10 Drawing Sheets

(56) References Cited

U.S. PATENT DOCUMENTS

| | | | |
|---|---|---|---|
| 2009/0222812 A1* | 9/2009 | Nissen | G06F 16/10 |
| | | | 717/173 |
| 2015/0331766 A1 | 11/2015 | Sarfare et al. | |
| 2016/0170844 A1* | 6/2016 | Long | G06F 16/21 |
| | | | 707/679 |
| 2016/0314048 A1* | 10/2016 | Liu | G06F 11/1461 |
| 2019/0163371 A1 | 5/2019 | Nambiar et al. | |
| 2020/0236121 A1* | 7/2020 | Spurlock | G06F 11/1456 |

OTHER PUBLICATIONS

Mell et al., "The NIST Definition of Cloud Computing", Recommendations of the National Institute of Standards and Technology, Sep. 2011, 7 pages.

Shackelford et al., "Workload Coordination on Disaster Recovery Site", U.S. Appl. No. 16/679,365, filed Nov. 11, 2019.

IBM, List of IBM Patents or Patent Applications Treated as Related, Nov. 8, 2019, 2 pages.

* cited by examiner

WORKLOAD COORDINATION ON DISASTER RECOVERY SITE

BACKGROUND

The present disclosure relates to disaster recovery sites for data storage, and, more specifically, to a protocol for implementing workloads on a disaster recovery site.

Disaster recovery sites (e.g., backup sites) refer to redundant data storage systems that are physically separate from a production site (e.g., primary site) and store copies of the data at the production site. Disaster recovery sites are useful for restoring lost data due to unexpected disasters, outages, corruptions, or other disruptions at the production site.

SUMMARY

Aspects of the present disclosure are directed toward a method comprising receiving a mirrored data stream at a disaster recovery site from a production site. The mirrored data stream includes a workload instruction stored in a reserved record set type of the mirrored data stream. The workload instruction indicates an operation to perform on a set of data that is replicated between the production site and the disaster recovery site. The workload instruction includes a time indicator indicating a correct version of the set of data. The method further comprises generating a consistency point by retrieving replicated data from the disaster recovery site corresponding to the correct version of the set of data in the production site, where the replicated data is associated with timestamps satisfying the time indicator. The method further comprises performing the operation on the consistency point and generating an output in response to performing the operation. The method further comprises transmitting the output to the production site.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
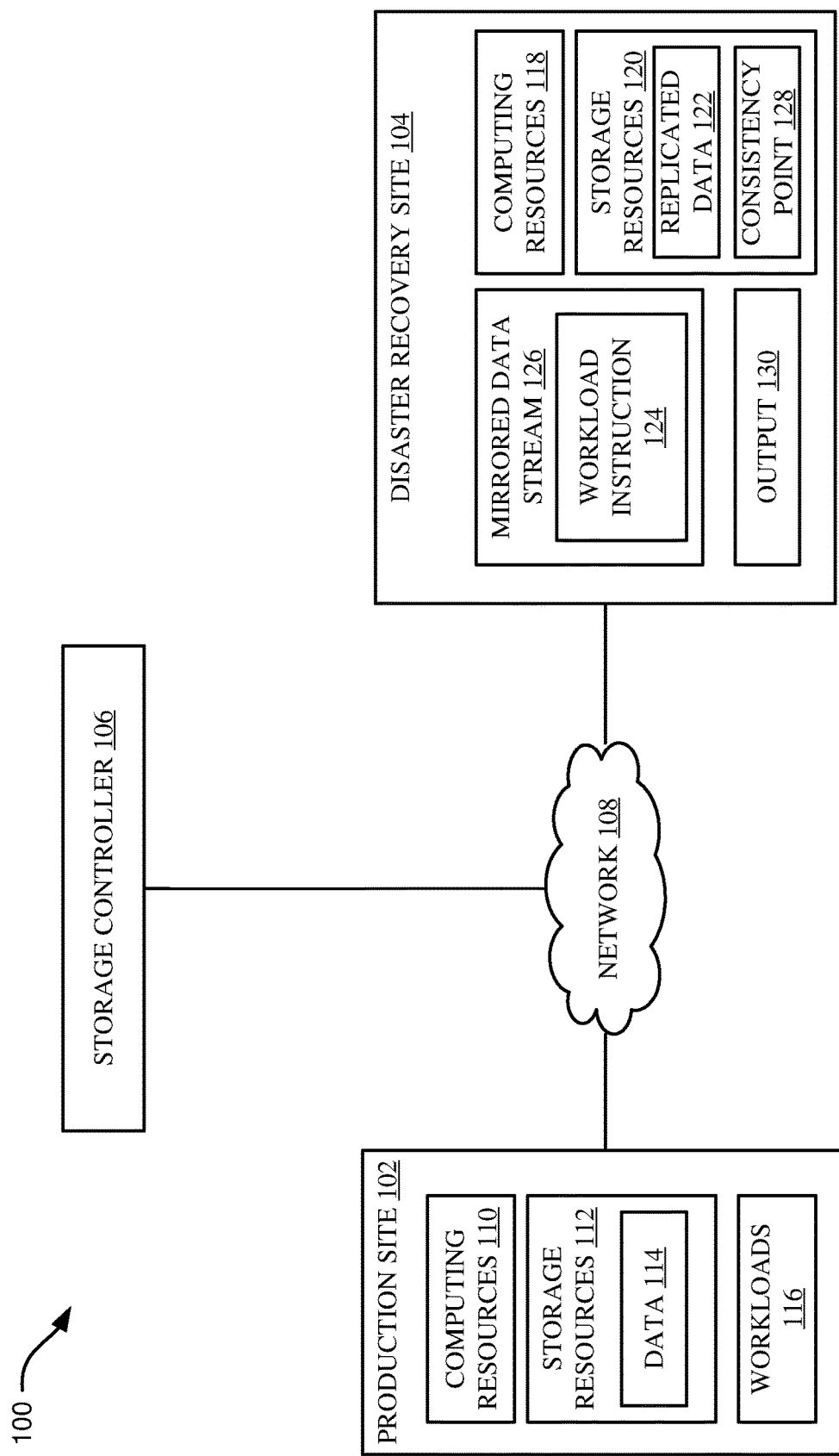
FIG. 1 illustrates a block diagram of an example storage system, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward disaster recovery sites for data storage, and, more specifically, to a protocol for implementing workloads on a disaster recovery site. While not limited to such applications, embodiments of the present disclosure may be better understood in light of the aforementioned context.

Workloads are traditionally implemented on a production site using the data stored at the production site. Disaster recovery sites are traditionally used for the redundant storage of data from the production site so that an additional copy of the data is retrievable in the event of data loss at the production site. However, disaster recovery sites can have idle resources and low resource utilization rates. Low resource utilization at a disaster recovery site is inefficient.

Aspects of the present disclosure are directed to utilizing idle resources at disaster recovery sites to perform workloads traditionally performed on the primary site. However, delegating a workload from a production site to a disaster recovery site is associated with a variety of challenges. For example, issuing instructions to a disaster recovery site consumes network bandwidth. As another example, performing workloads on a disaster recovery site can create complicated issues related to what version of archived data to perform the workload on (or if the newest version of replicated data is sufficiently "fresh"). For example, a production site may have an updated version of data that is not available on the disaster recovery site. As a result, a workload implemented on the disaster recovery site may generate inaccurate results if the data that the workload is executed against is not sufficiently up-to-date.

Advantageously, aspects of the present disclosure are directed to an efficient protocol for delegating workloads from a production site to a disaster recovery site by embedding workload information into a mirrored data stream. The workload information includes a time indicator for creating a consistency point with appropriate versions of the replicated data on the disaster recovery site. The workload information can be embedded into a designated record set type, or the workload information can be embedded into a designated location of the mirrored data stream, such as, for example, a reserved extent, a reserved track, a reserved disk sector, and the like. When the workload information is embedded into a designated record set type, the workload information can be associated with a channel control word (CCW), such as a prefix channel control word, and the CCW can trigger the production site to store the workload information in the designated record set type.

FIG. 1 illustrates an example storage system 100, in accordance with some embodiments of the present disclosure. Storage system 100 includes a production site 102, a disaster recovery site 104, and a storage controller 106 communicatively coupled to one another by a network 108.

The production site 102 can be a primary site including computing resources 110, storage resources 112, and workloads 116. The computing resources can refer to, for example, single core computer processors (CPUs), dual core processors, triple core processors, quad core processors, three-dimensional processors, graphics processing units (GPUs), and/or other computing resources. Storage resources 112 can refer to, for example, disks, volumes, drives, memory devices, storage hardware, storage networks, and the like. More specifically, the storage resources 112 can include hard disk drives (HDDs), solid state drives (SSDs), network attached storage (NAS), flash storage, optical drives, tape drives, volatile memory, non-volatile memory, cache memory, a redundant array of independent disks (RAID), and/or other types of storage. Both the computing resources 110 and the storage resources 112 can be physically present within production site 102 and/or virtually provisioned to the production site 102.

Storage resources 112 can include data 114. Data 114 can be in the form of block storage or object storage, according to various embodiments. Data 114 can refer to, for example, part of, one of, or a plurality of files, databases, instructions, metadata, text, video, audio, and the like.

Workloads 116 can refer to operations performed by the production site 102 on the data 114 using the computing resources 110 and the storage resources 112. Workloads 116 can include creating new data, modifying existing data, deleting data, reading data, writing data, and the like. In some embodiments, workloads 116 are defined based on user input and executed as an application, where the application includes an instruction set for performing computer operations on data 114 and generating an output (e.g., new data, a report, a determination, a prediction, etc.) in response to executing the operations on the data 114. Non-limiting examples of workloads 116 can include: modifying a text file, adding a database entry, performing one or more arithmetic operations between two or more data entries, training a machine learning model, generating a prediction using a trained machine learning model, and/or other workloads.

Disaster recovery site 104 can include computing resources 118 and storage resources 120. Computing resources can be similar to the computing resources 110 of production site 102, though the performance, functionality, and/or capability of the computing resources 118 compared to computing resources 110 may be different. Likewise, storage resources 120 can be similar to storage resources 112 of the production site 102, though the performance, functionality, and/or capability of the storage resources 120 compared to the storage resources 112 may be different.

Storage resources 120 can store replicated data 122, where the replicated data 122 is a copy of the data 114 stored in production site 102 at a certain time. Although one replicated data 122 is shown, in some embodiments, an archive of replicated data 122 can be stored in the storage resources 120 of the disaster recovery site 104, where each discrete replicated data 122 is associated with a timestamp indicating a time when the replicated data 122 was replicated to the disaster recovery site 104 from the production site 102. Timestamps can be useful for characterizing a version of the replicated data 122.

Disaster recovery site 104 further includes a workload instruction 124. Workload instruction 124 can be received at the disaster recovery site 104 from the production site 102 via the network 108. In some embodiments, the workload instruction 124 is transmitted to the disaster recovery site 104 as a part of a mirrored data stream 126. In other words, the workload instruction 124 can be appended to, incorporated into, and/or transmitted together with data 114 when data 114 is replicated to the disaster recovery site 104 in the mirrored data stream 126. Advantageously, including the workload instruction 124 in the mirrored data stream 126 does not increase network traffic since the mirrored data stream 126 is sent to the disaster recovery site 104 as part of a data backup and redundancy protocol regardless of whether or not a workload instruction 124 is included in the mirrored data stream 126.

The workload instruction 124 can include instructions for performing a workload (such as one of workloads 116) on the disaster recovery site 104 rather than the production site 102. The workload instruction 124 can include a time indicator that defines an appropriate version of replicated data 122 upon which to perform the workload. The time indicator can be used by the disaster recovery site 104 to create a consistency point 128, where the consistency point 128 includes data from replicated data 122 that satisfies the time indicator (e.g., equals the time indicator, is newer than the time indicator, etc.) included in the workload instruction 124. The disaster recovery site 104 can perform the workload defined in the workload instruction 124 using the computing resources 118 of the disaster recovery site 104. The workload can be performed on the data aggregated in the consistency point 128. In response to performing the workload, the disaster recovery site 104 can generate an output 130. Output 130 can refer to an output file, a report, a confirmation, an answer, a model or a different output that is generated in response to implementing the workload instruction 124 using the computing resources 118 of the disaster recovery site 104. The output 130 can be transmitted to the production site 102 via the network 108.

Storage controller 106 can refer to any orchestrator system or functionality that is associated with one or both of the production site 102 and/or the disaster recovery site 104. The storage controller 106 can be configured to manage the creation, storage, deletion, backup, mirroring, and/or processing of data within and/or between the production site 102 and/or the disaster recovery site 104. Although a single storage controller 106 is shown, in some embodiments, there is a discrete storage controller associated with each of the production site 102 and the disaster recovery site 104. Network 108 can refer to a physical network, a virtual network, or a combination of both. The network 108 can continuously or intermittently connect the production site 102 to the disaster recovery site 104.

Although a single production site 102 and a single disaster recovery site 104 are shown, in some embodiments, there are multiple production sites 102 and/or multiple disaster recovery sites 104. Furthermore, although each site is classified as "production" or "disaster recovery" in FIG. 1, in some embodiments, each site performs some production functions and some disaster recovery functions. For example, a first site may function as a production site for a first set of data and as a disaster recovery site for a second set of data. Meanwhile, a second site may function as a production site for the second set of data and a disaster recovery site for the first set of data. Finally, the term "site" as used in the present disclosure can refer to a composition of one or more networks together with one or more resources. A site can correspond to a discrete physical location, or a site can correspond to a distributed set of computing resource that are virtually grouped together despite being physically distributed.

Aspects of storage system 100 can represent, for example, a DS8000® storage system including various functionalities such as, but not limited to, Global Mirror, Metro Mirror, Extended Remote Copy (XRC), Peer-to-Peer Remote Copy (PPRC), and/or other features useful for data storage, data reliability, and/or data redundancy.

Figure 2:
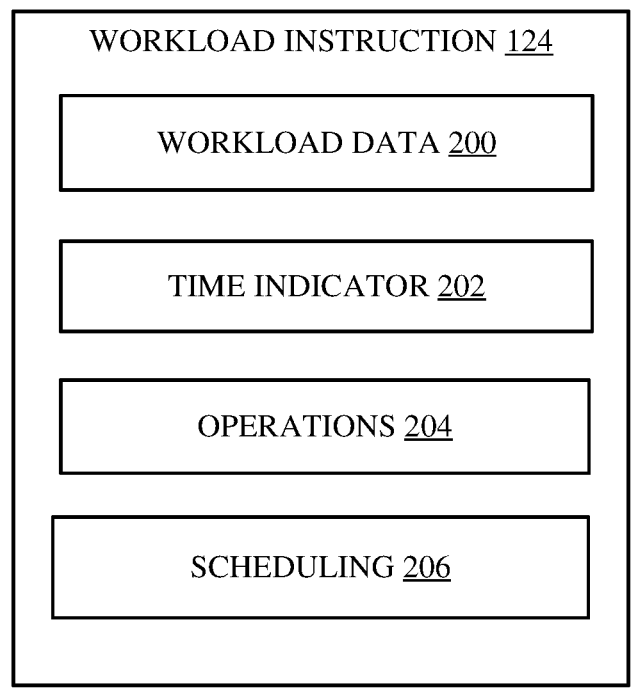
FIG. 2 illustrates a block diagram of a workload instruction, in accordance with some embodiments of the present disclosure.

FIG. 2 illustrates a block diagram of an example workload instruction 124, in accordance with some embodiments of the present disclosure. Workload instruction 124 can include workload data 200, time indicator 202, operations 204, and scheduling 206. Workload data 200 can identify the data needed to perform the workload. For example, workload data 200 can identify a file name, a database name, a storage location, or another identifier useful for identifying data to be used in executing a workload. The time indicator 202 can be used to define an appropriate version of the workload data 200 upon which to perform the operations 204. In some embodiments, the time indicator 202 can be a timestamp or version information that is useful for identifying a correct version of data. In some embodiments, the time indicator 202 is used to retrieve correct replicated data 122 from an archive of replicated data 122 in order to create the consistency point 128. Time indicator 202 can identify a time in the past, a current time, or a future time, according to various embodiments. Further, to satisfy the time indicator 202, timestamps associated with the replicated data 122 can equal or be newer (e.g., more recent) than the time indicator 202.

Operations 204 can define the actions to be performed on the consistency point 128. Operations 204 can be arithmetic operations, analysis operations, predictive operations, data compression or decompression operations, data encryption or decryption operations, data formatting operations, data conversion operations, and the like. Scheduling 206 can include information related to a time at which the workload instruction 124 is implemented by the disaster recovery site 104. For example, the disaster recovery site 104 may have a relatively large excess of computing resources 118 between 4:00 AM and 5:00 AM, and, accordingly, the scheduling 206 may define the workload instruction 124 to be implemented at 4:00 AM. As another example, the scheduling 206 can function as a trigger, where the workload instruction 124 is implemented by the disaster recovery site 104 when the computing resources 118 of the disaster recovery site 104 have a utilization below a threshold. In this example, the scheduling 206 can be a threshold utilization level such as 50%. In this example, when the computing resources 118 of the disaster recovery site 104 have a utilization level below the threshold utilization level, then the disaster recovery site 104 can automatically execute the workload instruction 124.

Figure 3:
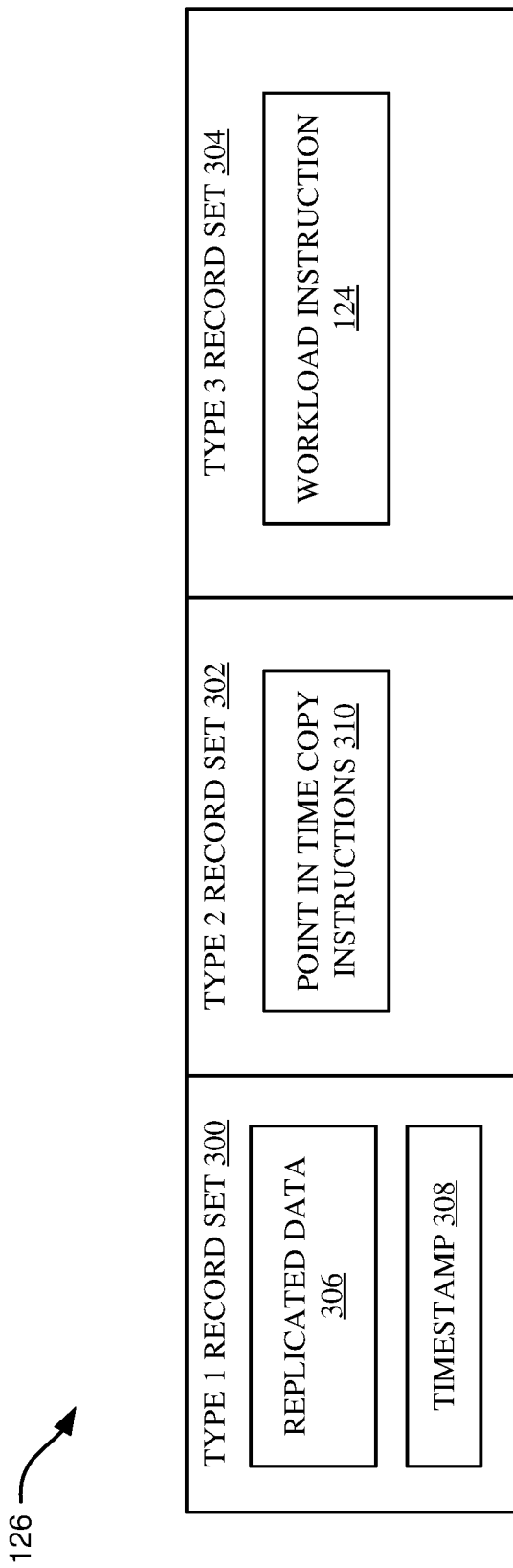
FIG. 3 illustrates a block diagram of a workload instruction stored in a record set of a mirrored data stream, in accordance with some embodiments of the present disclosure.

FIG. 3 illustrates an example of a workload instruction 124 stored in mirrored data stream 126 including a plurality of record set types, in accordance with some embodiments of the present disclosure. The mirrored data stream 126 can include numerous record set types such as, for example, a type 1 record set 300, a type 2 record set 302, and a type 3 record set 304. The type 1 record set 300 can be used to transmit replicated data 306, where the replicated data 306 is associated with a timestamp 308 indicating a version of the replicated data 306. Although a single type 1 record set 300 is shown, in some embodiments, many type 1 record sets 300 are included in the mirrored data stream 126. Further, the replicated data 306 can be an entire snapshot of replicated data, or, in other embodiments, the replicated data 306 includes only the data that has changed since a last version of the data was replicated to the disaster recovery site 104.

The type 2 record set 302 can be associated with point-in-time copy instructions 310. Point-in-time copy instructions 310 can include instructions for executing a copy (e.g., a FlashCopy®) within one or more storage resources 120 of the disaster recovery site 104 (or amongst multiple storage resources of multiple disaster recovery sites).

The type 3 record set 304 (also referred to a reserved, designated, or dedicated record set type) can include the workload instruction 124, in accordance with some embodiments of the present disclosure. In some embodiments, the type 3 record set 304 is a primarily used or exclusively used for storing workload instructions such as workload instruction 124. In some embodiments, the production site 102 stores the workload instruction 124 in the type 3 record set 304 based on a designated channel command word (CCW) (also referred to as a channel control word) associated with the workload instruction 124. CCWs can refer to instructions configured for a specialized Input/Output (I/O) channel processor. CCWs can be configured to initiate operations such as "read" operations, "write" operations, "sense" operations, and/or other operations on a device attached to the specialized I/O channel processor. In some embodiments, a prefix type CCW is used as the designated CCW to indicate that the workload instruction 124 should be stored in the type 3 record set 304. In other words, the designated CCW can function as an indicator of the existence of the workload instruction 124, and, upon detecting the designated CCW, the production site 102 can automatically embed the workload instruction 124 in the type 3 record set 304 of the mirrored data stream 126. Thus, the designated CCW can function as a trigger for appropriately storing the workload instruction 124 in the type 3 record set 304 of the mirrored data stream 126.

Figure 4:
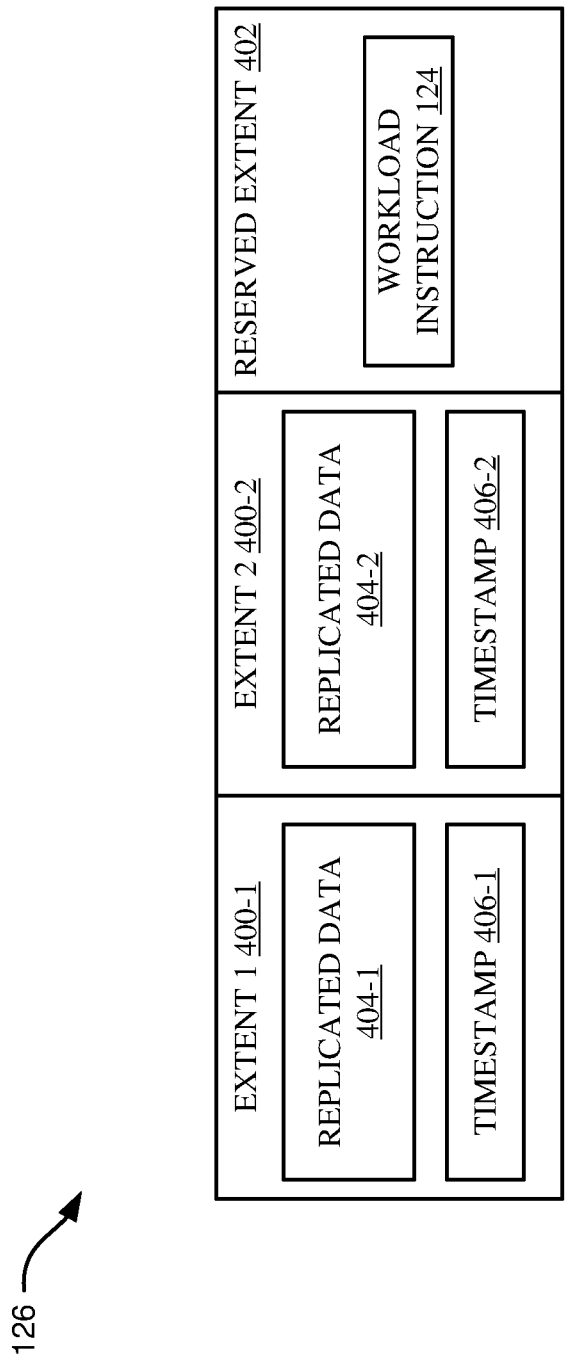
FIG. 4 illustrates a block diagram of a workload instruction stored in a reserved extent of a mirrored data stream, in accordance with some embodiments of the present disclosure.

FIG. 4 illustrates an example of a workload instruction 124 stored in a mirrored data stream 126 including extents, in accordance with some embodiments of the present disclosure. The mirrored data stream 126 shown in FIG. 4 can comprise numerous extents such as extent 1 400-1, extent 2 400-2, and a reserved extent 402 (e.g., dedicated extent, designated extent, predefined extent, etc.). Extent 1 400-1 can be associated with replicated data 404-1 and an associated timestamp 406-1 indicating a version of the replicated data 404-1. Similarly, extent 2 400-2 can include replicated data 404-2 and an associated timestamp 406-2 indicating a version of the replicated data 404-2. As discussed previously, the mirrored data stream 126 can include every extent of the production site 102 replicated to the disaster recovery site 104, or, in other embodiments, the mirrored data stream 126 includes only those extents that have been updated since a previous version of data 114 from production site 102 was replicated to the disaster recovery site 104.

Mirrored data stream 126 further includes reserved extent 402. Reserved extent 402 stores workload instruction 124. In various embodiments, reserved extent 402 can be any extent in a mirrored data stream 126 such as a first (e.g., initial) extent, a last (e.g., final) extent, or any intermediate extent. In some embodiments, the reserved extent 402 is used only for transmitting workload instruction 124. As a result, disaster recovery site 104 can query the reserved extent 402 upon receiving the mirrored data stream 126 in order to determine if there is any workload instruction 124 in the mirrored data stream 126.

In some embodiments, each of extent 1 400-1, extent 2 400-2, and reserved extent 402 are transmitted in a type 1 record set (e.g., type 1 record set 300) that is used for transmitting data from production site 102 to the disaster recovery site 104. In such situations, there can also exist type 2 record sets (e.g., type 2 record set 302) in the mirrored data stream 126.

Figure 5:
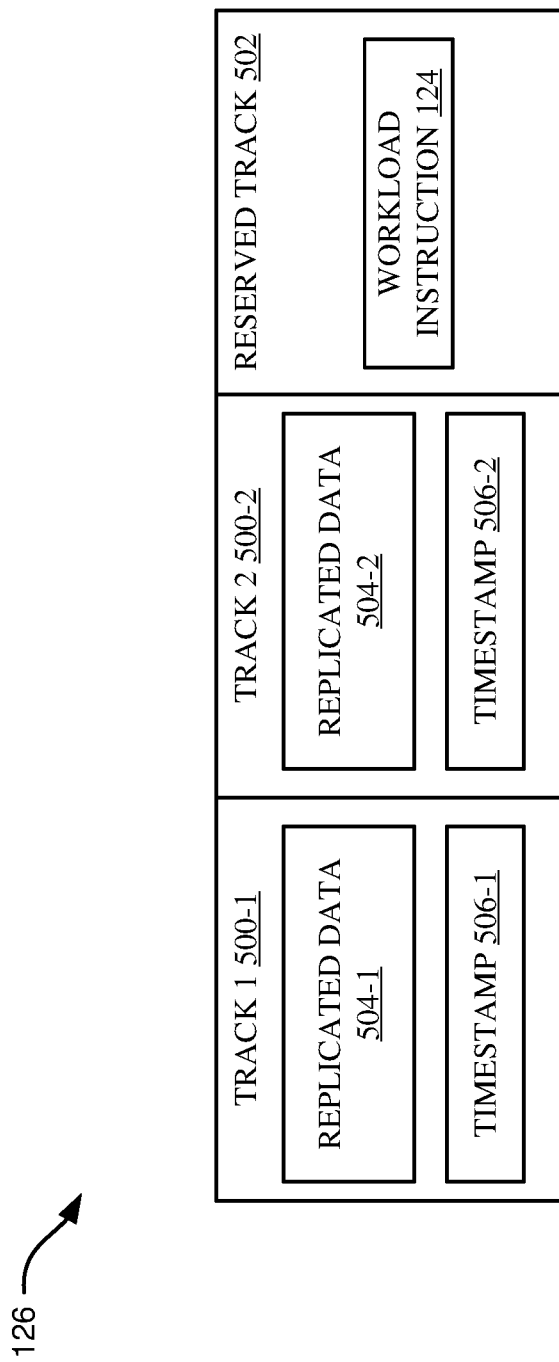
FIG. 5 illustrates a block diagram of a workload instruction stored in a reserved track of a mirrored data stream, in accordance with some embodiments of the present disclosure.

FIG. 5 illustrates an example of a workload instruction 124 stored in a mirrored data stream 126 including tracks, in accordance with some embodiments of the present disclosure. The mirrored data stream 126 shown in FIG. 5 can comprise numerous tracks such as track 1 500-1, track 2 500-2, and a reserved track 502 (e.g., dedicated track, designated track, predefined track, etc.). Track 1 500-1 can be associated with replicated data 504-1 and an associated timestamp 506-1 indicating a version of the replicated data 504-1. Similarly, track 2 500-2 can included replicated data 504-2 and an associated timestamp 506-2 indicating a version of the replicated data 504-2. As discussed previously, the mirrored data stream 126 can include every track of the production site 102 replicated to the disaster recovery site 104, or, in other embodiments, the mirrored data stream 126 includes only those tracks that have been updated since a previous version of data 114 from production site 102 was replicated to the disaster recovery site 104.

Mirrored data stream 126 further includes reserved track 502. Reserved track 502 stores workload instruction 124. In various embodiments, reserved track 502 can be any track in a mirrored data stream 126 such as a first (e.g., initial) track, a last (e.g., final) track, or any intermediate track. In some embodiments, the reserved track 502 is used only for transmitting workload instruction 124. As a result, disaster recovery site 104 can query the reserved track 502 upon receiving the mirrored data stream 126 in order to determine if there is any workload instruction 124 in the mirrored data stream 126. The reserved track 502 can take the form of a whole or partial track of a disk storage device. Likewise, the reserved track 502 can take the form of a reserved disk sector of a disk storage device. Likewise, the reserved track 502 can take the form of a reserved storage location on a tape storage device.

In some embodiments, each of track 1 500-1, track 2 500-2, and reserved track 502 are transmitted in a type 1 record set (e.g., type 1 record set 300) that is used for transmitting data from production site 102 to the disaster recovery site 104. In such situations, there can also exist type 2 record sets (e.g., type 2 record set 302) in the mirrored data stream 126.

Figure 6:
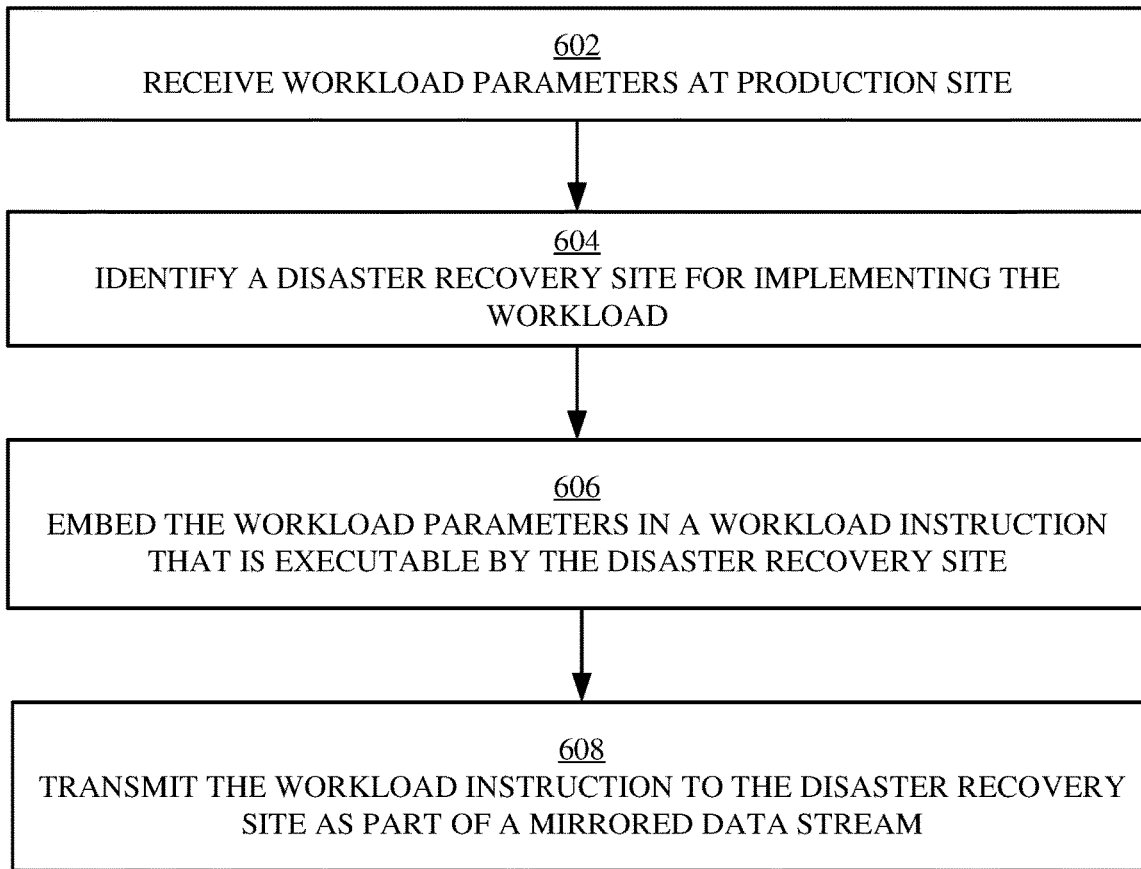
FIG. 6 illustrates a flowchart of an example method for generating a workload instruction at a production site for implementation by a disaster recovery site, in accordance with some embodiments of the present disclosure.

FIG. 6 illustrates a flowchart of an example method for generating a workload instruction 124, in accordance with some embodiments of the present disclosure. In some embodiments, the method 600 is implemented by a production site 102, a storage controller 106, or a different configuration of hardware and/or software.

Operation 602 includes receiving workload parameters at a production site 102. The workload parameters can be user defined, automatically generated, or a combination of user defined and automatically generated. The workload parameters can identify at least (1) a set of data for performing a workload against (e.g., workload data 200), (2) a version of the set of data for performing the workload against (e.g., a time indicator 202), and/or (3) operations constituting the workload (e.g., operations 204). In some embodiments, the workload parameters further include a time condition or trigger condition for initiating the workload (e.g., scheduling 206). For example, the workload parameters can be instructions for generating a customized report from a designated set of data at a certain time. As another example, the workload parameters can include instructions for scanning a certain version of data for corruptions when a resource utilization is below a threshold utilization. As another example, the workload parameters can include instructions for converting a first version of files from a first format to a second format. Furthermore, the workload parameters can define performance characteristics for implementing the workload, such as, for example, a minimum network latency, a minimum amount of computing power, and the like.

Operation 604 includes identifying a disaster recovery site 104 for implementing the workload according to the workload parameters defined in operation 602. Identifying a disaster recovery site 104 can include verifying that the disaster recovery site 104 has sufficient computing resources 118 and/or appropriate replicated data 122 for implementing the workload defined in operation 602.

Operation 606 includes embedding the workload parameters defined in operation 602 into a workload instruction 124. The workload instruction 124 can be a machine readable and processor executable instruction set for implementing a workload. The workload instruction 124 can include one or more of workload data 200, a time indicator 202, operations 204, and/or scheduling 206.

Operation 608 includes transmitting the workload instruction 124 to the disaster recovery site 104 in a mirrored data stream 126. Operation 608 can include storing the workload instruction 124 into the mirrored data stream 126. For example, the workload instruction 124 can be stored in a type 3 record set 304 (e.g., based on a prefix type CCW) of the mirrored data stream 126. As another example, the workload instruction 124 can be stored in a reserved extent 402, a reserved track 502, or a different reserved storage location of the mirrored data stream 126.

Figure 7:
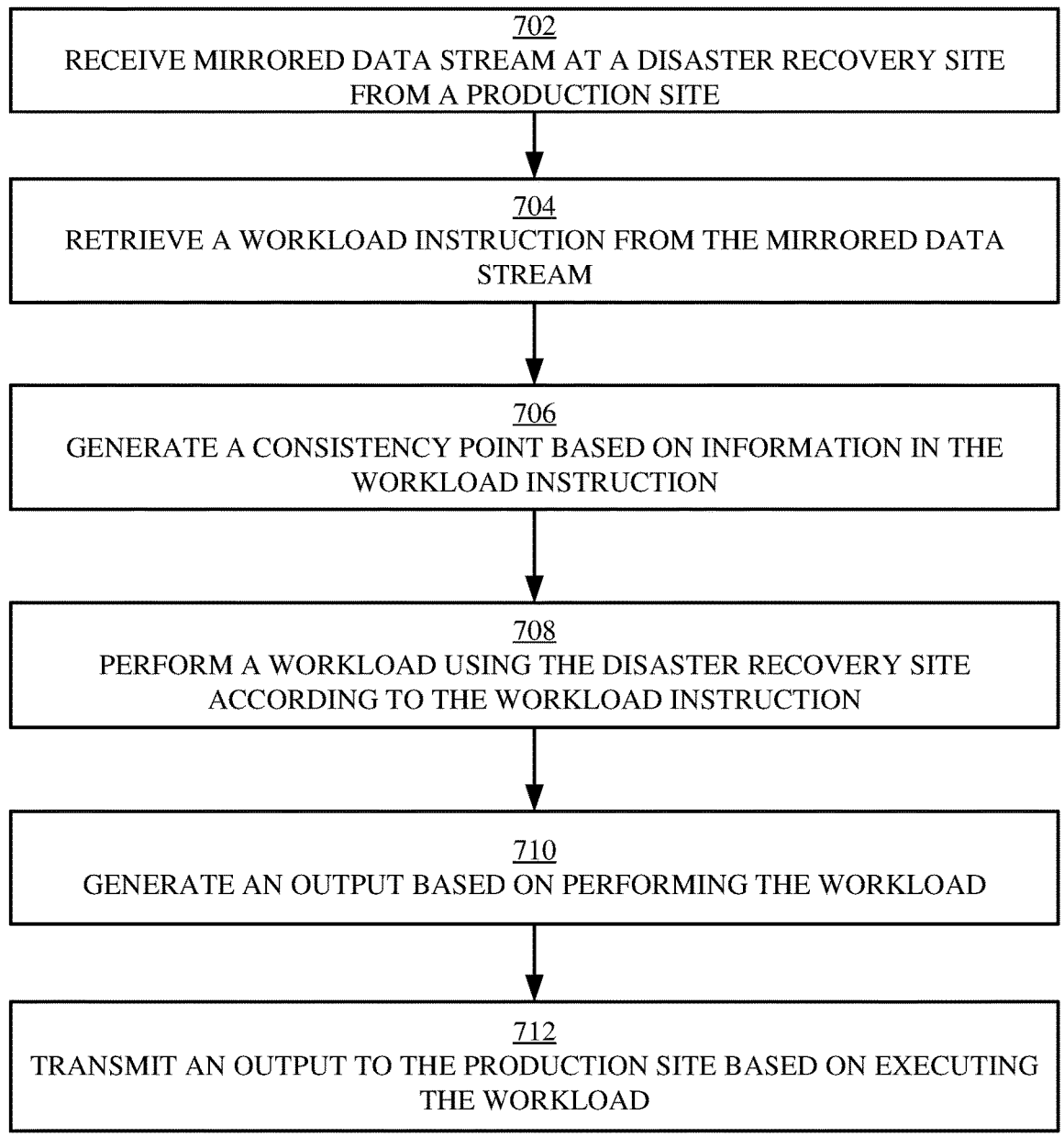
FIG. 7 illustrates a flowchart of an example method for implementing a workload at a disaster recovery site based on a workload instruction included in a mirrored data stream, in accordance with some embodiments of the present disclosure.

FIG. 7 illustrates a flowchart of an example method 700 for executing a workload on a disaster recovery site 104 based on a workload instruction 124 received at the disaster recovery site 104 in a mirrored data stream 126 from a production site 102. In some embodiments, the method 700 occurs after the method 600 of FIG. 6. In some embodiments, the method 700 is implemented by a disaster recovery site 104, a storage controller 106, or a different configuration of hardware and/or software.

Operation 702 includes receiving the mirrored data stream 126 at the disaster recovery site 104 from the production site 102. Operation 704 includes retrieving a workload instruction 124 from the mirrored data stream 126. In some embodiments, the disaster recovery site 104 identifies the existence of the workload instruction 124 in the mirrored data stream by querying (1) a type 3 record set 304, (2) a reserved extent 402, and/or (3) a reserved track 502 of the mirrored data stream 126.

Operation 706 includes generating a consistency point 128 based on information in the workload instruction 124, such as, for example, a time indicator 202. In some embodiments, the disaster recovery site 104 retrieves replicated data 122 that satisfies the time indicator 202 and compiles the retrieved data into the consistency point 128. For example, the disaster recovery site 104 can retrieve replicated data 122 with timestamps that equal the time indicator 202. As another example, the disaster recovery site 104 can retrieve replicated data 122 with timestamps that are equal to or newer than (e.g., more recent than) the time indicator 202. The consistency point 128 can be useful for ensuring an appropriate version of data is used to perform the workload.

Operation 708 includes performing a workload using computing resources 118 of the disaster recovery site 104 according to the workload instruction 124. In some embodiments, operation 708 includes performing operations 204 on the consistency point 128. In some embodiments, operation 708 includes performing the workload at a time designated by scheduling 206 such as a predetermined time or in response to satisfying a predetermined trigger.

Advantageously, using the computing resources 118 of the disaster recovery site 104 can increase utilization of the disaster recovery site 104. Furthermore, implementing the workload instruction 124 based on replicated data 122 satisfying a consistency point 128 ensures that an appropriate version of the replicated data 122 is used for implementing the workload instruction 124.

Operation 710 includes generating an output 130 in response to performing the workload. In various embodiments, the output 130 can be a new file, an updated file, an answer, a prediction, a model, or the like. Operation 712 includes transmitting the output 130 to the production site 102.

Figure 8:
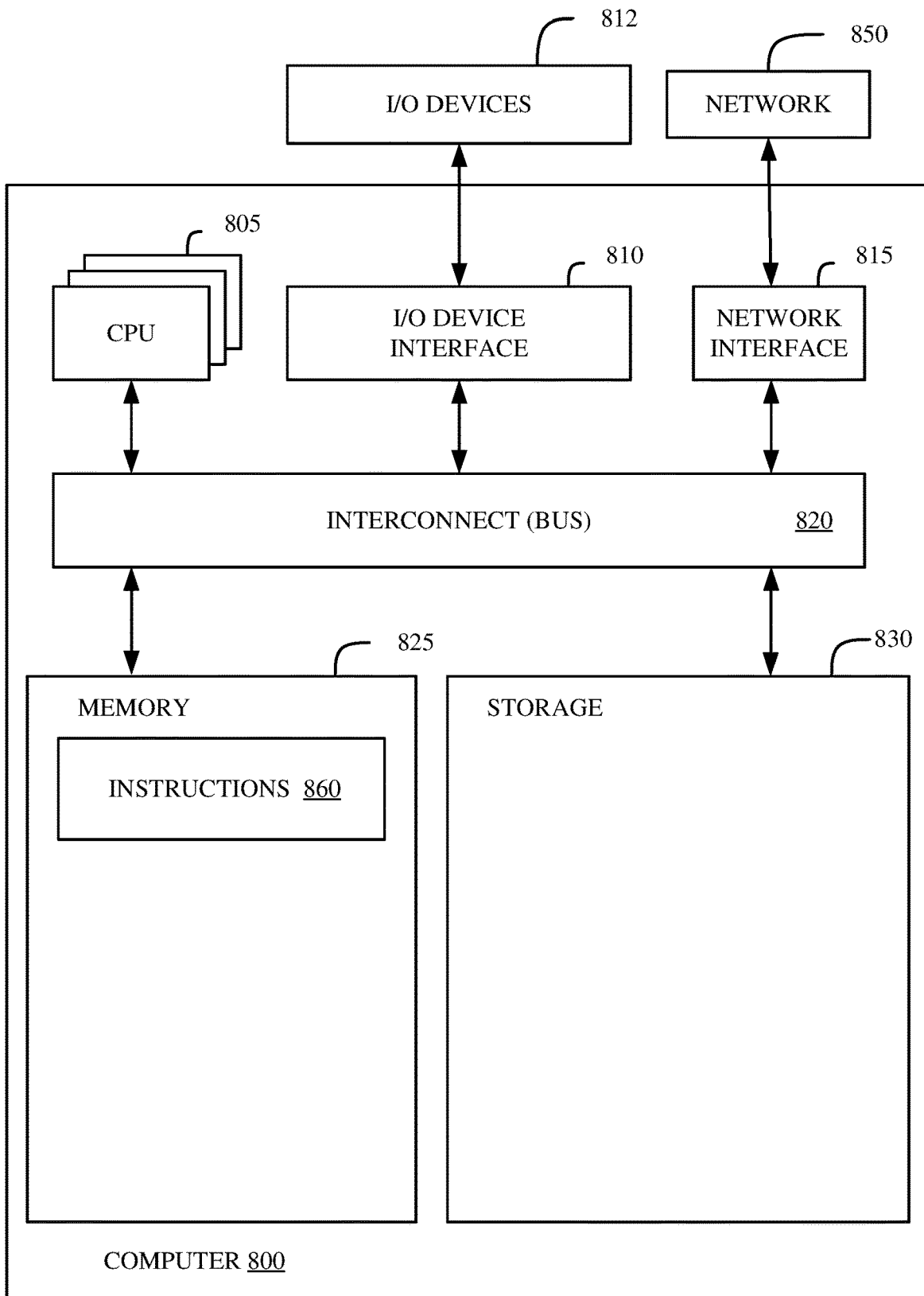
FIG. 8 illustrates a block diagram of an example computer, in accordance with some embodiments of the present disclosure.

FIG. 8 illustrates a block diagram of an example computer 800 in accordance with some embodiments of the present disclosure. In various embodiments, computer 800 can perform the methods described in FIGS. 6-7 and/or implement the functionality discussed in FIGS. 1-5. In some embodiments, computer 800 receives instructions related to the aforementioned methods and functionalities by downloading processor-executable instructions from a remote data processing system via network 850. In other embodiments, computer 800 provides instructions for the aforementioned methods and/or functionalities to a client machine such that the client machine executes the method, or a portion of the method, based on the instructions provided by computer 800. In some embodiments, the computer 800 is incorporated into (or equivalent functionality is virtually provisioned to) one or more of a production site 102, a disaster recovery site 104, and/or a storage controller 106.

Computer 800 includes memory 825, storage 830, interconnect 820 (e.g., BUS), one or more CPUs 805 (also referred to as processors herein), I/O device interface 810, I/O devices 812, and network interface 815.

Each CPU 805 retrieves and executes programming instructions stored in memory 825 or storage 830. Interconnect 820 is used to move data, such as programming instructions, between the CPUs 805, I/O device interface 810, storage 830, network interface 815, and memory 825. Interconnect 820 can be implemented using one or more busses. CPUs 805 can be a single CPU, multiple CPUs, or a single CPU having multiple processing cores in various embodiments. In some embodiments, CPU 805 can be a digital signal processor (DSP). In some embodiments, CPU 805 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 825 is generally included to be representative of a random-access memory (e.g., static random-access memory (SRAM), dynamic random access memory (DRAM), or Flash). Storage 830 is generally included to be representative of a non-volatile memory, such as a hard disk drive, solid state device (SSD), removable memory cards, optical storage, or flash memory devices. In an alternative embodiment, storage 830 can be replaced by storage area-network (SAN) devices, the cloud, or other devices connected to computer 800 via I/O device interface 810 or network 850 via network interface 815.

In some embodiments, memory 825 stores instructions 860. However, in various embodiments, instructions 860 are stored partially in memory 825 and partially in storage 830, or they are stored entirely in memory 825 or entirely in storage 830, or they are accessed over network 850 via network interface 815.

Instructions 860 can be processor-executable instructions for performing any portion of, or all of, any of the methods of FIGS. 6-7 and/or implementing any of the functionality discussed in FIGS. 1-5.

In various embodiments, I/O devices 812 include an interface capable of presenting information and receiving input. For example, I/O devices 812 can present information to a user interacting with computer 800 and receive input from the user.

Computer 800 is connected to network 850 via network interface 815. Network 850 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
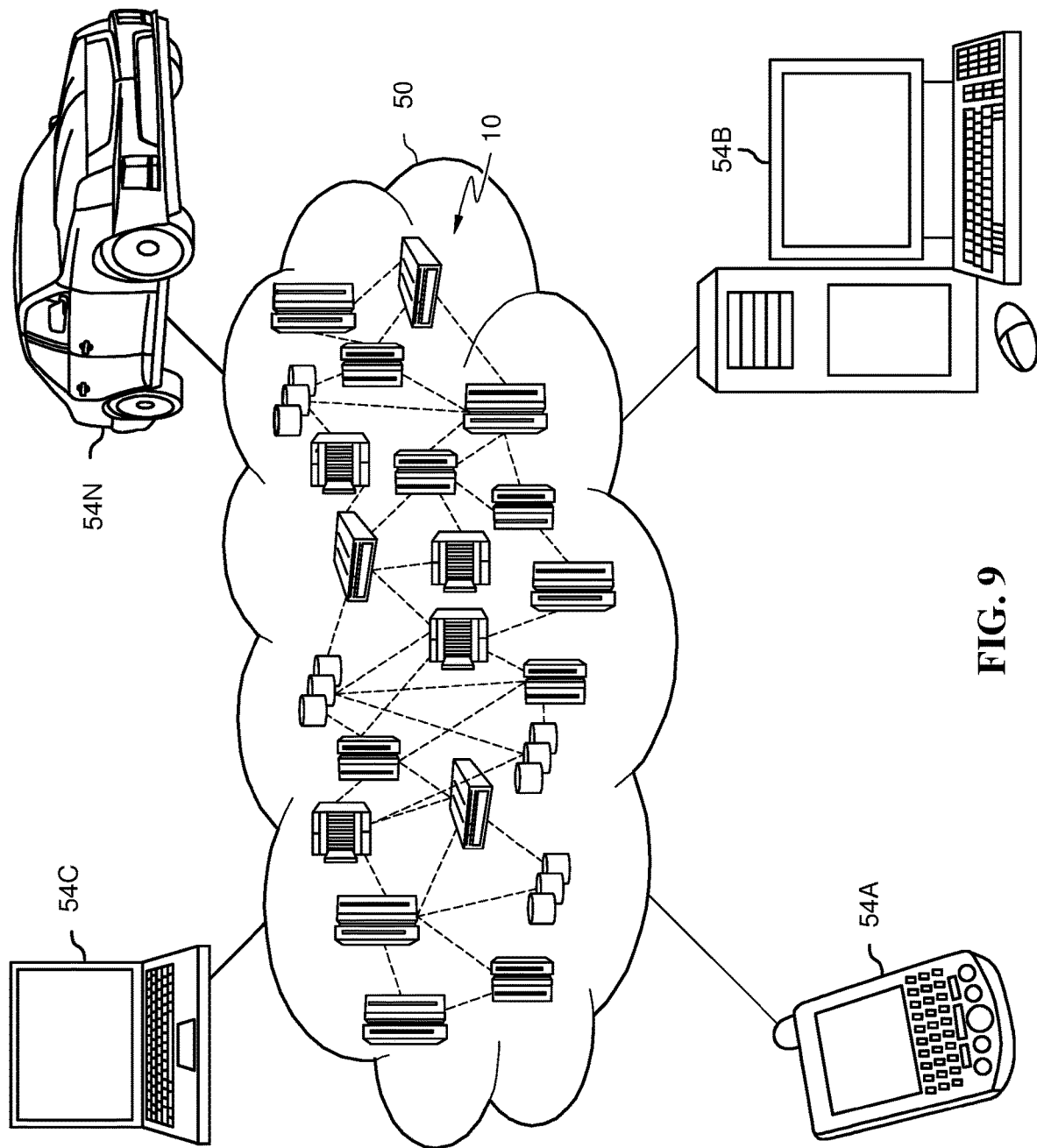
FIG. 9 depicts a cloud computing environment, in accordance with some embodiments of the present disclosure.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
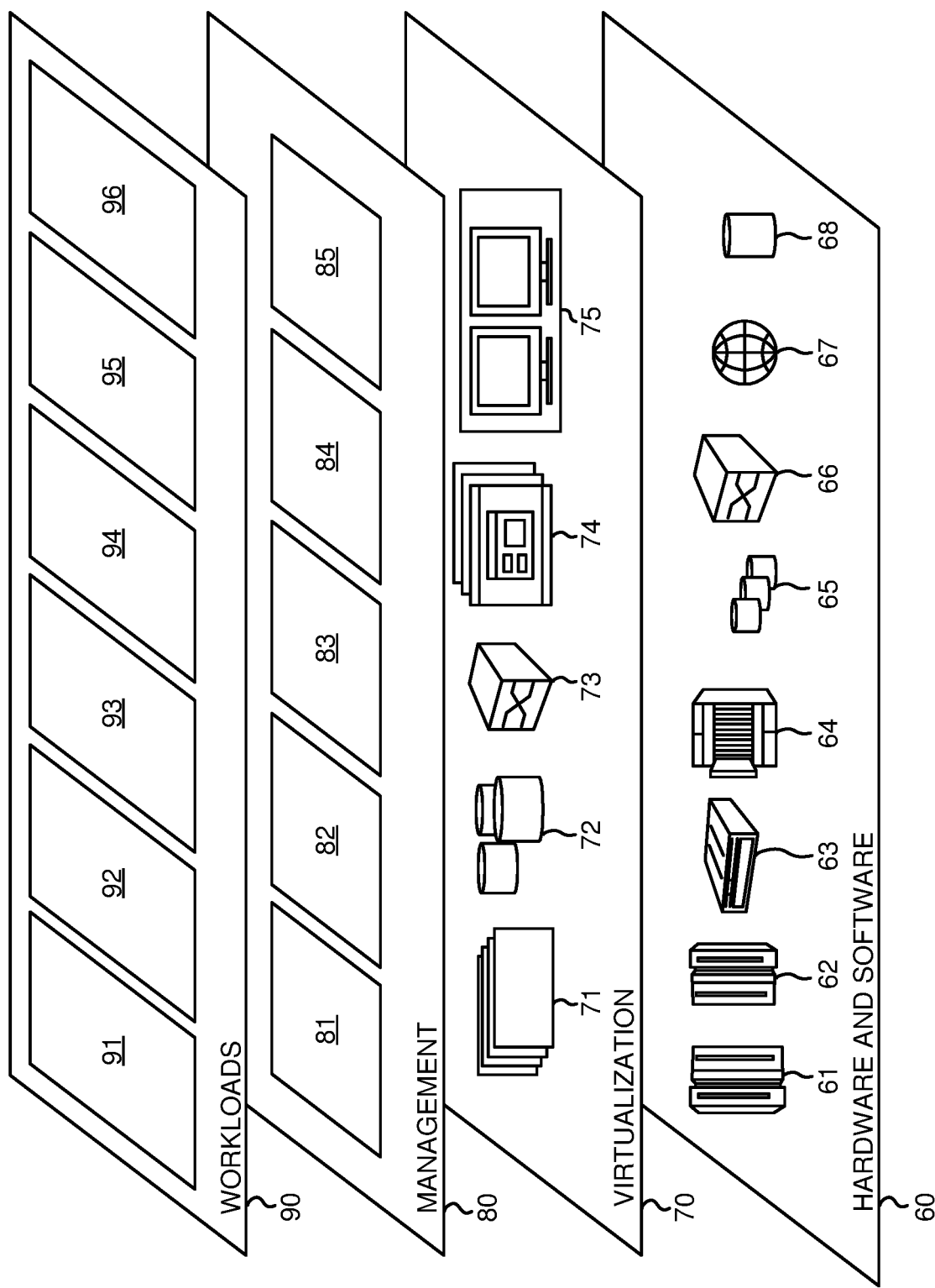
FIG. 10 depicts abstraction model layers, in accordance with some embodiments of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workload coordination 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 860 of FIG. 8 and/or any software configured to perform any subset of the methods described with respect to FIGS. 6-7 and/or any of the functionality discussed in FIGS. 1-5) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A method comprising:
receiving a mirrored data stream at a disaster recovery site from a production site, wherein the mirrored data stream includes a workload instruction stored in a reserved record set type of the mirrored data stream, wherein the reserved record set type is generated by the production site based on a prefix channel control word associated with the workload instruction, wherein the workload instruction indicates an operation to perform on a set of data that is replicated between the production site and the disaster recovery site, wherein the workload instruction includes a time indicator indicating a correct version of the set of data;
generating a consistency point by retrieving replicated data from the disaster recovery site corresponding to the correct version of the set of data in the production site, wherein the replicated data is associated with timestamps satisfying the time indicator;
performing the operation on the consistency point using computing resources of the disaster recovery site;
generating an output in response to performing the operation; and
transmitting the output to the production site.

2. The method of claim 1, wherein the mirrored data stream includes a plurality of record set types comprising:
a first record set type including updated data;
a second record set type storing instructions for executing a point-in-time copy of the updated data; and
the reserved record set type storing the workload instruction.

3. The method of claim 1, wherein the reserved record set type is a type 3 reserved record set.

4. The method of claim 1, wherein the production site comprises a first redundant array of independent disks, and wherein the disaster recovery site comprises a second redundant array of independent disks.

5. The method of claim 1, wherein the workload instruction includes a designated time to perform the workload instruction, and wherein the performing the operation includes performing the operation at the designated time.

6. The method of claim 1, wherein the workload instruction includes a trigger for performing the workload instruction, and wherein the performing the operation includes performing the operation in response to satisfying the trigger.

7. The method of claim 6, wherein the trigger comprises a resource utilization of the disaster recovery site that is below a threshold utilization.

8. The method of claim 1, wherein the disaster recovery site performs the method by executing instructions downloaded from a remote data processing system.

9. The method of claim 1, wherein prior to receiving the mirrored data stream at the disaster recovery site, the method further comprises:
receiving, at the production site, workload parameters for the workload;
verifying that the disaster recovery site includes sufficient computing resources for performing the workload;
embedding the workload parameters as the workload instruction in the reserved record set type based on a prefix channel control word associated with the workload parameters; and
transmitting the reserved record set type with the workload instruction to the disaster recovery site as part of the mirrored data stream.

10. A system comprising:
a processor; and
a computer-readable storage medium storing program instructions which, when executed by the processor, are configured to cause the processor to perform a method comprising:
receiving a mirrored data stream at a disaster recovery site from a production site, wherein the mirrored data stream includes a workload instruction stored in a reserved record set type of the mirrored data stream, wherein the reserved record set type is generated by the production site based on a prefix channel control word associated with the workload instruction, wherein the workload instruction indicates an operation to perform on a set of data that is replicated between the production site and the disaster recovery site, wherein the workload instruction includes a time indicator indicating a correct version of the set of data;
generating a consistency point by retrieving replicated data from the disaster recovery site corresponding to the correct version of the set of data in the production site, wherein the replicated data is associated with timestamps satisfying the time indicator;
performing the operation on the consistency point using computing resources of the disaster recovery site;
generating an output in response to performing the operation; and
transmitting the output to the production site.

11. The system of claim 10, wherein the mirrored data stream includes a plurality of record set types comprising:
a first record set type including updated data;
a second record set type storing instructions for executing a point-in-time copy of the updated data; and
the reserved record set type storing the workload instruction.

12. The system of claim 10, wherein the reserved record set type is a type 3 reserved record set.

13. The system of claim 10, wherein the production site comprises a first redundant array of independent disks, and wherein the disaster recovery site comprises a second redundant array of independent disks.

14. The system of claim 10, wherein the workload instruction includes a designated time to perform the workload instruction, and wherein the performing the operation includes performing the operation at the designated time.

15. The system of claim 10, wherein the workload instruction includes a trigger for performing the workload instruction, and wherein the performing the operation includes performing the operation in response to satisfying the trigger.

16. The system of claim 15, wherein the trigger comprises a resource utilization of the disaster recovery site that is below a threshold utilization.

17. The system of claim 10, wherein prior to receiving the mirrored data stream at the disaster recovery site, the method further comprises:
receiving, at the production site, workload parameters for the workload;
verifying that the disaster recovery site includes sufficient computing resources for performing the workload;
embedding the workload parameters as the workload instruction in the reserved record set type based on a prefix channel control word associated with the workload parameters; and
transmitting the reserved record set type with the workload instruction to the disaster recovery site as part of the mirrored data stream.

18. A computer program product comprising a computer readable storage medium having program instructions embodied therewith, the program instructions executable by a processor to cause the processor to perform a method comprising:
receiving a mirrored data stream at a disaster recovery site from a production site, wherein the mirrored data stream includes a workload instruction stored in a reserved record set type of the mirrored data stream, wherein the reserved record set type is generated by the production site based on a prefix channel control word associated with the workload instruction, wherein the workload instruction indicates an operation to perform on a set of data that is replicated between the production site and the disaster recovery site, wherein the workload instruction includes a time indicator indicating a correct version of the set of data;
generating a consistency point by retrieving replicated data from the disaster recovery site corresponding to the correct version of the set of data in the production site, wherein the replicated data is associated with timestamps satisfying the time indicator;
performing the operation on the consistency point using computing resources of the disaster recovery site;
generating an output in response to performing the operation; and
transmitting the output to the production site.

19. The computer program product of claim 18, wherein the mirrored data stream includes a plurality of record set types comprising:
a first record set type including updated data;
a second record set type storing instructions for executing a point-in-time copy of the updated data; and
the reserved record set type storing the workload instruction.

20. The computer program product of claim 18, wherein the reserved record set type is a type 3 reserved record set.

* * * * *